Jan. 26, 1960 V. GRAZIANO 2,922,841
FILM SCANNING SYSTEM
Filed Aug. 17, 1953 3 Sheets-Sheet 2
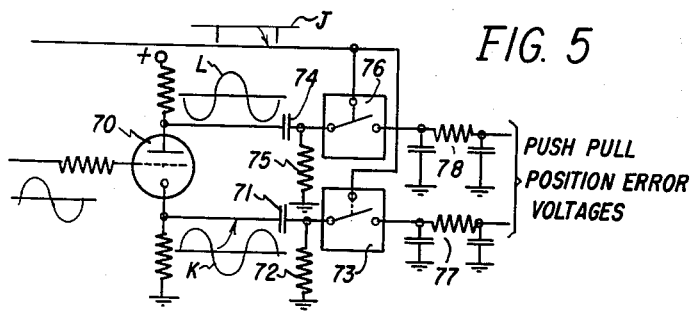
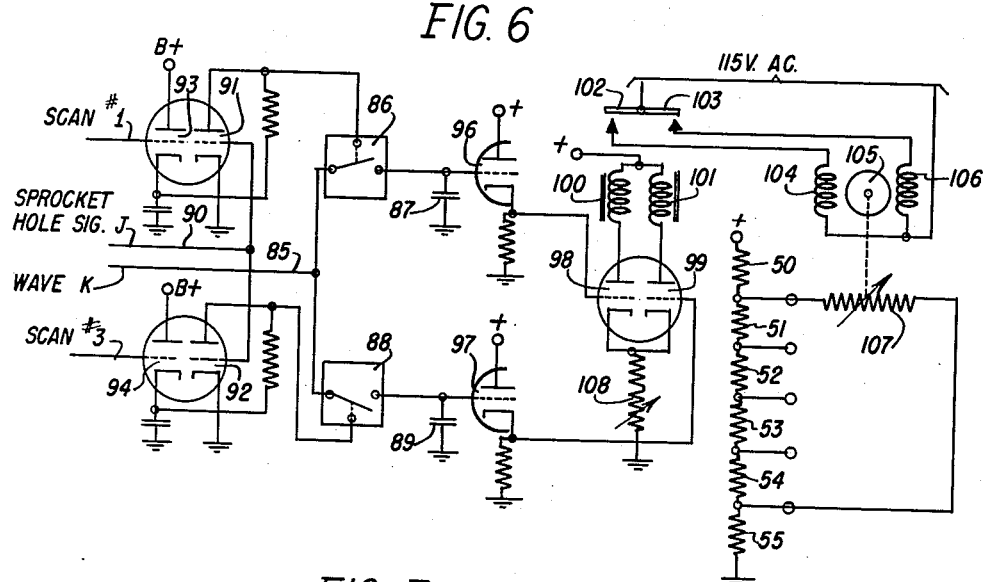
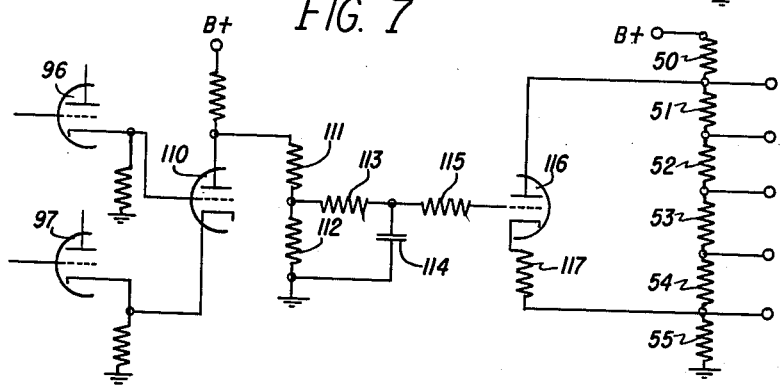
INVENTOR.
Victor Graziano
BY
Atty.

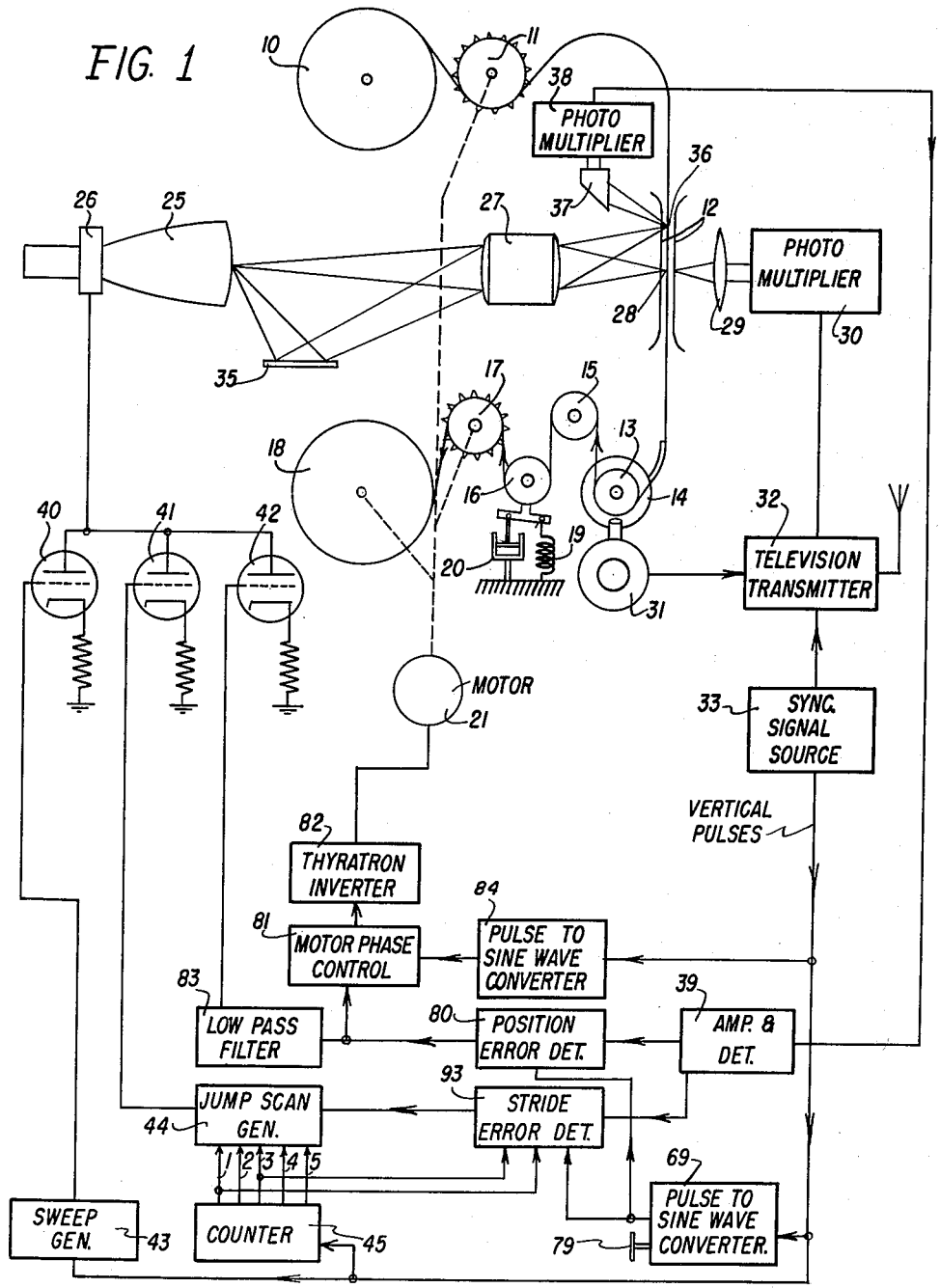

Jan. 26, 1960
V. GRAZIANO
2,922,841
FILM SCANNING SYSTEM
Filed Aug. 17, 1953
3 Sheets-Sheet 3
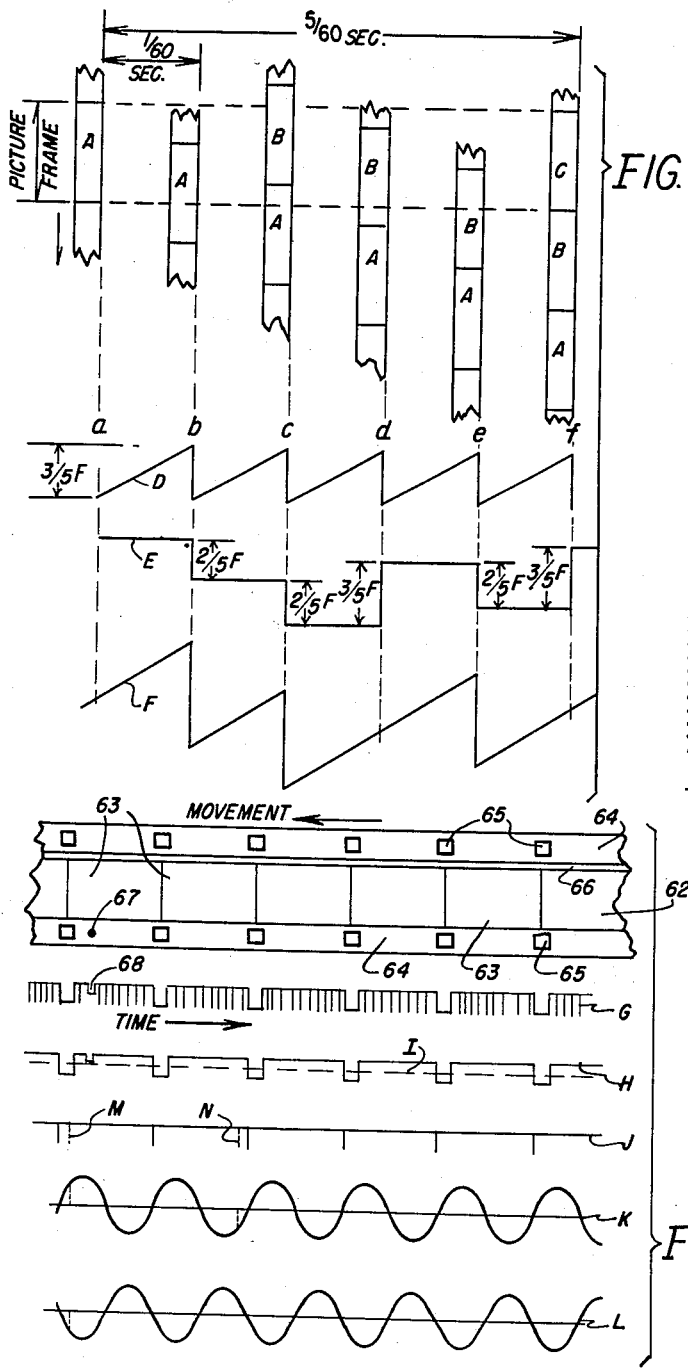
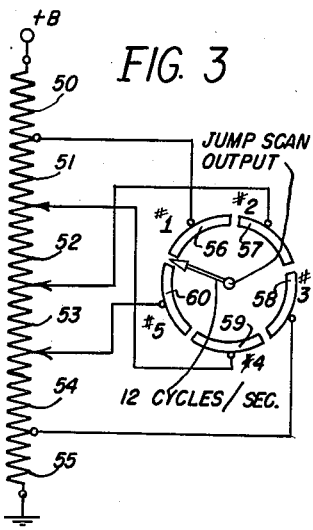
INVENTOR.
Victor Graziano
BY
Atty.

United States Patent Office 2,922,841
Patented Jan. 26, 1960

2,922,841

FILM SCANNING SYSTEM

Victor Graziano, Oak Park, Ill., assignor to Motorola, Inc., Chicago, Ill., a corporation of Illinois Application August 17, 1953, Serial No. 374,629

20 Claims. (Cl. 178—6.8)

This invention relates generally to the transmission of motion picture films by television, and more particularly to a film scanning system providing continuous film motion, with the film being scanned by a flying spot in a jump-scan movement.

Presently available film scanners for television have not been satisfactory to produce pictures of the quality desired. The scanning of the film for television projection is complicated by the fact that standard film provides 24 frames per second whereas the television scan requires 60 frames or fields per second. This conversion may be accomplished by scanning one picture frame three times and the next picture frame two times, thereby converting the 24 frame per second film into a 60 field per second television scan.

Although film scanning and/or projection is usually accomplished by intermittent movement of the film, systems have been proposed wherein continuous film movement is used. In such systems rotating prisms, mirrors, or the like have been used to effectively stop the film movement. This results in relatively heavy rotating mechanical units which must be very accurate and which cannot easily be shifted to compensate for errors in the system such as errors in the film itself and/or shrinkage of the film.

It is therefore an object of the present invention to provide an improved film scanning system.

A further object of the invention is to provide an improved film scanning system wherein the film moves continuously and uniformly and a jump-scan movement is used which follows the movement of the film to thereby effectively stop the film movement.

A still further object of the invention is to provide a television film scanning system wherein the film is driven continuously by a system which eliminates high frequency variations in film movement, and the scan which follows the film corrects for low frequency errors in the film movement.

Another object of the invention is to provide a television film scanning system using continuous film movement and jump-scanning, in which the scanning movement is automatically adjusted to compensate for shrinkage of the film.

A feature of the invention is the provision of television film scanning apparatus in which the film is driven continuously at substantially uniform speed and is scanned by a flying spot scanner in a jump-scan movement which follows the film movement and provides the required scanning of the film frames to provide the television scan of 60 fields per second, with automatic control means to insure registry of the succeeding fields.

A further feature of the invention is the provision of stabilization means for a television film scanner including a mechanical film drive having a flywheel and damping means for eliminating fast variations and an error feedback system for correcting for slow variations in film movement. The error feedback system includes control of the driving motor to compensate for fixed shifts in position of the film and adjustment of the scanning movement to compensate for slow changes in film position.

Another feature of the invention is the provision of an automatic system for adjusting the jump-scan movement to automatically and continuously correct for shrinkage of the film or other errors affecting the jump-scan movement.

Further objects, features, and the attending advantages of the invention will be apparent from a consideration of the following description when taken in connection with the following drawings, in which:

Figure 1 illustrates schematically the over-all system of the invention;

Figure 2 is a chart illustrating the jump-scan movement;

Figure 3 is a circuit for providing jump-scan movement;

Figure 4 illustrates the development of the position indications from the film sprocket holes;

Figure 5 is a circuit for providing the position-correcting voltage; and

Figures 6 and 7 are circuits for compensating the jump-scan movement for film shrinkage.

In practicing the invention there is provided a film scanning system in which the film is moved continuously past an optical system which projects a flying spot on the film for modulation thereby. The film is driven by a mechanical system which includes a relatively heavy flywheel and an idler controlled by a spring and dashpot mechanism so that high frequency variations of movement (more than 1.8 cycles per second) are materially reduced by the mechanical system. The flying spot scans the film in a jump-scan movement which follows the film movement to thereby effectively stop the movement of the film, and provides repeated scanning of individual frames to convert the 24 frame per second film to a 60 field per second television scan. This is accomplished by scanning half the frames 3 times and the remaining frames only 2 times. Light from the source is also directed onto the film sprocket holes, with the reflections therefrom being picked up and converted to pulses indicating the positions of the leading edges of the sprocket holes. These pulses are combined with the pulses controlling the vertical movement of the scan to provide a position error signal. The position error signal is fed back to the motor and scanning system and controls the motor phase to compensate for fixed shifts in position, and controls the scanning movement to compensate for slow fluctuations in position. The signal from the sprocket holes is also used to provide a stride error signal which is fed back to the scanning system and adjusts the jump-scan movement to compensate for shrinkage of the film, and for drift or other errors in the jump-scan system.

Referring now to the drawing, in Figure 1 there is illustrated the over-all system including the mechanical film driving mechanism and the system for scanning the film. The film is provided on a supply reel 10 and is driven by a first sprocket wheel 11, with the film continuing to a gate where it is held in position by the pressure plates 12. It is noted that a loose loop of film is provided between the sprocket wheel 11 and the pressure plates to isolate the gate from movement of the sprocket wheel. The gate may be flat or slightly curved, the particular construction thereof not being important for an understanding of the invention. The film continues to roller 13, to which is attached a flywheel 14, over fixed idler 15 to movable idler 16 and thence over the take-up sprocket 17 to the take-up reel 18. The movable idler 16 is controlled by a spring 19 and dashpot 20. The spring holds the idler tight against the film to take up slack therein and the dashpot dampens the movement of the idler so that oscillation of the system is prevented. The flywheel 15 is sufficiently heavy to prevent high speed fluctuations in the speed of the film movement as will be more fully described. The sprockets 11 and 17, as well as the take-up reel 18, are driven by a motor 21.

The film is scanned by a beam from a flying spot scanner 25. The movement of this beam is controlled by yoke 26 which is connected to a horizontal scanning system not shown, and to the vertical deflecting system to be described more in detail. The light from the scanner 25 passes through the lens 27 to the film at the point 28, with the light modulated by the film passing through the condenser lens 29 to the photomultiplier 30. The photomultiplier 30 translates the modulated light beam into a picture intensity signal, which together with the sound signal from the sound head assembly 31 and the synchronization signals from the source 33 may be applied to a television transmitter 32.

Light from the flying spot scanner is also directed by the mirror 35 through the lens 27 to the point 36 on the film which is the edge of the film including the sprocket holes. These holes which are provided to facilitate driving the film, as by the sprockets 11 and 17 respectively, are accurately positioned with respect to the frames on the film. The material behind the film, which is exposed by the sprocket holes, has a low reflection index so that less light is reflected when the holes appear than from the film itself. Light reflected from the film is collected by the prism 37 and applied to the photomultiplier 38 which produces a signal which is a measure of the reflection. The signal from the photomultiplier 38 is applied to a detector and amplifier 39 and is used in the scanning control system as will be further described.

The vertical deflection of the flying spot is produced by a yoke structure fed by three components which are furnished by the three tubes 40, 41 and 42, respectively. A yoke structure having bifilar windings may be used in which case a duplicate set of tubes, connected in push-pull, is required. This balances out the direct current component of the plate current through the tubes. The yoke may be of the construction shown in Schlesinger Patent No. 2,562,394, wherein correction for astigmatism is provided. The tube 40 provides the standard sawtooth deflection of the beam vertically over an amplitude which provides scanning of the vertical height of a motion picture frame. The amplitude of vertical sweep required is reduced because of the vertical movement of the film. This sawtooth sweep current is provided by the sweep generator 43 which is controlled by the vertical pulses from the synchronization signal source 33. The generator may be of any standard sawtooth current generator construction. The amplitude of vertical sweep can be independently controlled so that any desired aspect ratio can be provided.

The tube 41 provides the jump-scan deflection component which produces bases or pedestals so that the various film frames will be scanned the desired number of times to provide 60 fields per second in the television signal. The jump-scan component is provided by a jump-scan generator 44 which is controlled by a counter unit 45 synchronized with the vertical pulses from the synchronizing signal source 33. For further consideration of the operation and structure of the jump-scan generator, reference is made to Figures 2 and 3 of the drawings. Figure 2 shows at the top the movement of the film so that the successive frames A, B, C, etc. are scanned. The frame A is scanned first as it moves from the position represented by the vertical line $a$ to the position shown at $b$. During this movement of the film the frame A is completely scanned, and this is accomplished in 1/60 of a second. The various different positions which are spaced 1/60 of a second are shown by different vertical columns indicated $a$, $b$, $c$, $d$, $e$, and $f$ in Figure 2, with the columns to the right showing the positions later in time. The frame A is scanned a second time while the film moves from position $b$ to position $c$, and again a third time when it moves from position $c$ to position $d$. After the frame A has been scanned three times, the frame B will then be scanned as it moves from the position $d$ to the position $e$, and a second time as the film moves from the position $e$ to the position $f$. At the time shown at $f$ it will be noticed that the frame C is in exactly the same position that the frame A was at the time $a$, and this frame will now be scanned with the scanning being repeated three times as in the case of frame A.

Curve D in Figure 2 illustrates the vertical sawtooth scanning wave which has been shortened to compensate for the film movement. Curve E illustrates the jump-scan pedestal wave which must be added to the sawtooth scanning wave. It will be noted that between the times $a$ and $b$, during which the first scan of the sequence takes place, the wave E will have the highest value. From $b$ to $c$ it will have a lower value and from $c$ to $d$ a still lower value. This permits repeated scanning of the same frame at three different positions. Between points $d$ and $e$ the next frame is being scanned the first time and the pedestal will have an intermediate value between that of the first and second scans. For the final scan in the sequence, between points $e$ and $f$, the pedestal will have an intermediate position between that of the second and third scans. At the point $f$, the pedestal will return to the initial position provided at the point $a$.

As is noted on the curve, the difference of the pedestal between the first and second scans is 2/5 of the frame height and likewise between the second and third scans the difference is 2/5 of the frame height. From the third to fourth scans the pedestal increases to an intermediate position which is 3/5 of a frame height greater. At the fifth position it is dropped 2/5 of a frame height and has the intermediate position between the second and third scans.

Curve F shows the combination of the sawtooth and jump-scanning components. This shows that between the first and second scans and between the second and third scans the wave drops to repeat the scanning of the same frame. Between the third and fourth scans the sweep is actually continuous since it moves from one frame to the next frame in a continuous manner. The wave then drops between the fourth and fifth scans, but will continue smoothly between the fifth scan and the sixth scan which is really the first scan of a new sequence.

The system for providing the jump-scan wave is illustrated in Figure 3. The rectangular wave form may be provided by merely switching connections to a voltage divider to provide the proper direct current voltage at any particular instant. This voltage divider is illustrated in Figure 3 as formed by a resistor having sections 50, 51, 52, 53, 54 and 55 which are connected in series between +B and ground. The value of the sections of the resistor are so related that the voltage at the junction between sections 50 and 51, which is applied to contact 56, gives the required voltage for the first scanning position. The voltage at the junction between sections 52 and 53 is applied to contact 57 and has the value required for the second scanning jump-scan position. The lower voltage between sections 54 and 55 is applied to contact 58 and provides the third scanning position. The intermediate voltage at the junction between sections 51 and 52 is applied to contact 59 and the lower intermediate voltage between sections 53 and 54 is applied to contact 60 for providing the fifth scanning position. The connections from contacts 57, 59 and 60 to the resistor are adjustable so that the values of the resistor sections can be set to provide the desired voltages.

To provide the wave shown in curve E of Figure 2, it is merely necessary to successively engage the contacts 56, 57, 58, 59 and 60. This voltage wave may be converted to a corresponding current wave for the yoke winding. To provide the desired scanning movement, the cycle including the five scanning positions must be completed in $\frac{1}{12}$ of a second so that connection is made with each of the contacts for a period of $\frac{1}{60}$ of a second. Such connections may be provided by various types of counters such as electronic ring counters or counter tubes which are available. The counter is synchronized with the vertical scanning pulses so that the timing of $\frac{1}{60}$ of a second for each connection may be accurately controlled by these pulses. Figure 1 shows the connection of the jump-scan generator 44 and counter 45, and the connection to the tube 41.

As previously stated, to provide good registry of the succeeding scans it is necessary to correct for low speed variations in film movement and for changes in the length of the film (shrinkage). This is accomplished by the use of a feedback circuit which operates from error signals produced by position indications obtained from the sprocket holes in the film. Figure 4 shows a section of film 62 on which are provided picture frames 63, and border strips 64 having sprocket holes 65 therein. Along one edge of the film may be provided a sound track 66. The light from the mirror 35 of Figure 1 is directed on one of the strips 64 and the part reflected by the border 64 is passed through prism 37 to the photomultiplier 38. The amount of light reflected will depend upon whether or not the beam strikes the film border or a sprocket hole. The film is of glossy material and will be quite efficient in reflecting light therefrom. A backing providing very little light reflection may be provided so that when the light strikes the sprocket holes, very little reflection will take place. The variation of the light reflected is illustrated by the curve G of Figure 4 which shows that the amplitude of the light decreases at the points corresponding to the sprocket holes. The amount of light reflected will be affected by a spot 67 on the border 64 which may be of some material having lower reflecting characteristics. This will cause a decrease in the light as indicated by the dip 68 in the curve G. The reflected light will be converted by the photomultiplier 38 to an electrical signal which will have the same wave form as the light (curve G). This signal is detected in the unit 39 to provide a wave as shown by curve H. This curve may then be clipped as shown by the dotted line I and the leading edges of the clipped wave may be differentiated to provide the pulse wave shown at J.

As indicated by the arrows, the physical movement of the film in Figure 4 is to the left, and the signals with respect to time are shown in a direction proceeding to the right. The wave J will therefore include pulses which are produced at the leading edges of the sprocket holes in the film. Each sprocket hole will produce two or three pulses as the associated frame is scanned two or three times. The pulses will therefore indicate the position of the frame being scanned in the various different positions thereof.

In order to provide a signal for compensating for a shift in the position of the film with respect to the center position thereof between the pressure plates 12 (Figure 1), the sprocket hole pulse wave J is combined with a sine wave produced from the vertical pulses derived from the synchronizing signal source 33 by the converter 69. This sine wave is shown by curve K in Figure 4. The circuit for combining the sprocket hole signals and the sine wave is shown in Figure 5. The sine wave is applied to the grid of a phase inverter tube 70 so that the sine wave is reproduced in the same phase at the cathode thereof and in opposite phase at the plate thereof. The opposite phase wave is shown by curve L in Figure 4.

The wave K is applied through condenser 71 and across resistor 72 to a clamp or gate 73. The out-of-phase wave L is similarly applied through condenser 74 and across resistor 75 to the clamp or gate 76. The gates 73 and 76 are opened by the pulses of wave J to apply the signals from resistors 72 and 75 respectively to the filters designated generally 77 and 78. If the sprocket hole pulses of wave J are at the cross-over points in the waves K and L, as shown in Figure 4, no voltage will be applied to the filters 77 and 78. If, however, the film is retarded in position so that the pulse of wave J is in the position shown by the dotted line M, the voltage of the wave K will be positive and of the wave L will be negative. Accordingly, a positive potential will be applied to the filter 77 and a negative potential to the filter 78. These potentials serve as push-pull position error voltages for correcting the position of the scan and/or the phase of the motor so that the position of the scan with respect to position of the film will be adjusted to eliminate this position error voltage. The filters 77 and 78 are low pass filters which eliminate high frequency components since the system is not capable of correcting for high frequency fluctuations and any high frequency components would have no significance. As has been stated, the mechanical system eliminates high frequency variations so that correction by the error signal for such variations may not be necessary.

The circuit illustrated in Figure 5 is shown in Figure 1 by the block 80 designated "position error detector." The push-pull voltage from the position error detector may be applied to a motor phase control 81 which controls the thyratron inverter 82 coupled to the driving motor 21. A sine wave synchronized with the vertical synchronization pulses is applied from the converter 84 to the motor phase control 81. The motor phase control compensates for fixed shifts in the position of the film so that the film will tend to take a center position. Because yoke distortion is less at the center position, the system is more accurate when scanning takes place at this position, and therefore it is desired that the mechanical system hold the film generally at the center position. A manual control 79 may be provided on the converter 69 to provide a manual phase adjustment of the sine wave produced thereby and this also provides an adjustment of the center position. This is necessary as the position of the frame break with respect to the sprocket holes differs on different films.

The position error signal is also applied through the low pass filter 83 to the tube 42 and provides a stabilizing current in the yoke which adjusts the scanning movement to compensate for low frequency fluctuations of the film movement. This causes the scanning movement to follow slow variations in film movement, and since fast variations are prevented by the mechanical system, accurate scanning is provided under all conditions.

As has been stated, compensation is also required for change in the length of the film. It has been found that film shrinks materially and unless correction is provided so that the jumps in the scanning movement correspond to the vertical dimension of the film frames, proper registry cannot be achieved. In Figure 6 there is illustrated a system which corrects for changes in the vertical height of the film frames. In the system of Figure 6 the sine wave K derived from the vertical synchronization pulses is applied to the conductor 85. The instantaneous voltage of this wave will be applied through gate 86 to condenser 87 or through gate 88 to condenser 89 when these gates are closed. The sprocket hole wave J from detector 39 is applied through conductor 90 to the grids of the triode sections 91 and 92. A signal from the counter 45 is applied to the grid of triode 93 during the first scanning period. This signal is applied from the cathode of triode 93 to the plate of triode 91 so that this triode conducts when the signal from the counter and a pulse from the wave J are simultaneously applied thereto. Similarly, a signal from the counter 45 is applied through the triode section 94 to the plate of the triode 92 to render this tube conducting in response to the sprocket hole pulse during the third scanning period. Therefore, the gate 86 will close to apply the voltage from conductor 85 to condenser 87 when the sprocket hole pulse during the first scan appears, and the gate 88 will close to apply the voltage from conductor 85 to condenser 89 when the signal from the same sprocket hole appears during the third scan.

The deviation of the time of occurrence of the sprocket hole signals from the first and third scans, with respect to the vertical synchronizing wave, will therefore be developed across the condensers 87 and 89. Referring to Figure 4, it may be assumed for illustration that the first sprocket hole signal appears at the time indicated by dotted line M, and the wave K applied from conductor 85 will therefore be positive to produce a positive voltage across condenser 87. If the film has shrunk the sprocket hole signal for the third scan will come too soon as indicated by dotted line N. This will close the gate 88 when the wave K on conductor 85 is negative so that a negative voltage will be developed across condenser 89. Therefore, push-pull stride error voltages indicating change in the frame height caused by shrinkage of the film will be developed.

The system for providing the push-pull stride error voltages is indicated on Figure 1 as the stride error detector 93. It is noted that signals are applied to this detector from the amplifier and detector 39 which produces the sprocket hole signals, from the sine wave converter 69 for the vertical synchronizing pulses, and from the connections for the number one and number three scans controlled by the counter 45. The output of the stride error detector is applied to the jump-scan generator 44 in a manner shown in Figure 6.

The voltages across condensers 87 and 89 are applied to the cathode follower stages 96 and 97 respectively, and the outputs of the cathode follower stages are applied to the differential amplifier including the double triode tube having sections 98 and 99. The differential amplifier is connected to differential relay including the windings 100 and 101 which control the contacts 102 and 103. The contact 103 energizes winding 104 of a one revolution per minute reversible motor 105 to cause the motor to operate in one direction. The contact 103 energizes winding 106 to cause rotation of the motor in the opposite direction.

The reversible motor is connected to a variable rheostat 107 which is connected across the resistors 51, 52, 53 and 54 of the jump-scan generator. These are the resistors shown in the circuit of Figure 3. Therefore, when the position error voltage developed across condensers 87 and 89 becomes sufficiently large to operate the differential relay, the motor will cause movement of the variable resistor 107 to change the resistance thereof to thereby change the current through resistors 50 and 55. This controls the potential across the resistors 51, 52, 53 and 54 and thereby controls the amplitude of the jump-scan. The resistors 50 and 51 must have equal values so that change of stride does not produce changes in position.

The stride control system of Figure 6 has been found to be highly satisfactory and has several important features. In the first place, the system does not operate until a predetermined threshold has been reached to render the same highly stable. Resistor 108 connected to the cathodes of sections of the differential amplifier may be adjusted to set the threshold value at the desired value. The system operates quite slowly and stride errors must exist for a relatively long time before correction takes place. This makes for a very stable system. Further, the system will hold any position at which it is set when the scanner is shut off, and therefore when the system is started again the same stride setting will be held until such time as the correcting system requires a change. This memory feature is quite important.

It will be apparent from the foregoing that if desired the stride control system can be used to adjust individual resistor sections to control the pedestal for a particular scan. In such case, the first scan can be used as reference and four stride control systems would be required to hold the following scans in stride. The system disclosed has an over-all stride control and has been found to be satisfactory in tests made.

In Figure 7 there is illustrated an all electronic circuit for applying the push-pull stride error detector voltages to the jump-scan generator to compensate for film shrinkage. The voltages at the cathodes of the tubes 96 and 97 may be applied to the grid and cathode respectively of a tube 110, and the effect thereof is combined in the voltage at the plate of this tube. This voltage is applied across the voltage divider formed by resistors 111 and 112, and the output applied through the filter including resistor 113, condenser 114, and resistor 115 to the grid of a control tube 116. The tube 116 has its cathode connected through resistor 117 to the common point between resistors 54 and 55 of the voltage divider forming the jump-scan pedestals, and the plate of the triode 116 is connected to the junction between resistors 50 and 51. The tube 116 therefore serves as a variable resistor connected across the sections of the voltage divider which provide the jump-scan pedestals. When the resistance of the tube is decreased by conduction therein, the current through the resistors 50 and 55 will be increased to adjust the voltage applied to the contacts. This drops the amplitude of the jump-scan pedestal to compensate for the reduction in the height of the picture frame caused by shrinkage of the film.

It is to be pointed out that in the systems of Figures 6 and 7 the stride error signal will adjust the jump-scan amplitude to correct for errors other than those resulting from film shrinkage, such as drift in the amplifiers and changes in the accelerating voltage of the flying spot. This is a very important correction for satisfactory operation of the system. The servomotor system of Figure 6 has the advantage that it is inherently highly stable and accurate. This system follows errors which may accumulate in either direction and always retains the same reference. The electronic system of Figure 7, which operates to minimize rather than to completely correct the error, has the advantage that it is extremely simple and very inexpensive.

It is therefore seen that a motion picture film scanning system for television use has been provided wherein a jump-scan movement is accurately controlled so that successive fields are in accurate registry. This is accomplished by the use of a mechanical film driving system which prevents high frequency variations in the film movement, together with a feedback error correcting system which compensates for any low frequency variations in the film movement. The feedback system also compensates for shrinkage of the film or drifting of the amplifiers by changing the amplitude of the jump-scan pedestals. This control can be accomplished by a motor servo system or by an all electronic system. The slow motor system has been found to be highly stable.

In order to hold the film centered about a single position, the error signal is applied to the driving motor to compensate for fixed shifts in position. This results in more accurate scanning, and as the low frequency variations in the film movement are compensated for by a stabilizing field which adjusts the scanning movement, very accurate reproduction is provided.

Although the film scanning system has been disclosed for use with monochrome film, it will be apparent that it may also be used for color film. In such case, the lens 29 will be replaced by a dichroic prism, and three photo multipliers will be required instead of the single photo multiplier 30. The signals from the three multipliers will then be combined in a matrix to provide a signal as used in any particular color television system.

The system is also applicable for use in producing kine recordings. In such case, two television fields may be used to expose each film frame and the fifth television field must be blanked out. This will convert from the 60 field television reproduction to a 24 frame motion picture film, with the exposures on each frame being the same. For such recording, the error signal cannot be produced during the used scanning portion, but may be provided by over-scanning the picture horizontally to reach the sprocket holes at the edge of the film.

Still another application of the correction provisions, in accordance with the invention, is in connection with the pick-up of television signals under conditions of vibrations. In such cases where there is a fixed reference, an error signal may be derived from movement of the camera with respect to the reference to correct the scanning on the television camera tube so that the effect of the vibration is eliminated.

Although certain embodiments of the invention have been described which are illustrative thereof, it is obvious that various changes and modifications can be made therein within the intended scope of the invention as defined by the appended claims.

I claim:

1. A motion picture film scanning system including in combination, film driving means for providing continuous movement of a motion picture film, means providing a flying spot for two dimensional scanning of the continuously moving film, said film driving means including means for reducing rapid variations in film movement, and means coupled to the film and responsive to the position of said spot thereon including a feedback circuit controlled by the instantaneous position of said spot on the film for altering the movement of said flying spot on the film to correct for slow variations in film movement.

2. A film scanning system including in combination, film driving means for providing continuous movement of a motion picture film, means providing a flying spot for scanning the continuously moving film, means for deflecting said spot in a jump-scan movement, and means coupled to the film and responsive to the position of said flying spot on the film including a feedback circuit controlled by the instantaneous position of said spot on the film for altering the deflection of said flying spot to compensate for variations in film movement.

3. A system for scanning motion picture film having picture frames thereon and indications on the film placed in fixed positions with respect to each frame, said system including in combination, film driving means for providing continuous movement of the film, said driving means including means for reducing rapid variations in film movement, means for directing a spot of light on the film to be modulated thereby, scanning means for providing movement of said spot of light across the film including means for directing a portion of the light on the indications on the film, means responsive to the light on said indications for providing a signal indicating the instantaneous position of the film, and means controlled by said signal for altering the movement of said scanning means to correct for slow variations in the movement of the film.

4. A film scanning system including in combination, film driving means for providing continuous movement of a motion picture film, said driving means including means for reducing rapid variations in film movement, means for directing a spot of light on the moving film to be modulated thereby, means for deflecting said spot of light across the film including means for providing vertical movement of said light spot having first, second and third portions, said first portion including means providing a field varying in accordance with a sawtooth wave providing relatively slow scanning movement in one direction and relatively fast scanning movement in the opposite direction, said second portion including means providing fixed fields having different values for succeeding scanning operations to provide repeated scanning of the same picture frame at different positions thereof, and said third portion including means responsive to the instantaneous position of said spot of light on the film for providing a stabilizing field to correct for slow variations in the movement of the film.

5. A system for scanning motion picture film having picture frames thereon and indications on the film placed in fixed positions with respect to each frame including in combination, film driving means for providing continuous movement of the film, said driving means including means for reducing rapid variations in film movement, means for directing a spot of light on the film to be modulated thereby, scanning means for providing movement of said spot of light across the film including means for providing vertical movement of said light spot having first, second and third portions, said first portion including means providing a sawtooth fluctuating field for relatively slow scanning in one direction and relatively fast scanning in the opposite direction, said second portion including means providing fixed fileds having different values for succeeding scanning operations to provide repeated scanning of individual picture frames on the film, said third portion correcting for slow variations in the movement of the film and including means for directing a portion of the light on the indications on the film, means responsive to the light at the indications for providing a signal indicating the instantaneous position of the film, and means controlled by said signal providing a stabilizing field for altering the scanning movement to compensate for slow variations in the movement of the film.

6. A system for scanning motion picture film having picture frames thereon and indications on the film placed in fixed positions with respect to each frame including in combination, film driving means for providing continuous movement of the film, said driving means including motor means and flywheel means for reducing rapid variations in film movement, means for directing a spot of light on the film which is modulated thereby, scanning means for providing movement of said spot of light across the film, including means for providing vertical movement of said light spot having first, second and third portions, said first portion including means providing a sawtooth fluctuating field for relatively slow scanning in one direction and relatively fast scanning in the opposite direction, said second portion including means providing fixed fields having different values for succeeding scanning operations to provide repeated scanning of individual picture frames on the film, said third portion correcting for slow variations in the movement of the film and including means for directing a portion of the light on the indications on the film, means responsive to the light at the indications for providing a signal indicating the instantaneous position of the film, and means controlled by said signal providing a stabilizing field for altering the scanning movement to compensate for slow variations in the movement of the film, and means controlled by said signal connected to said motor means for adjusting the phase thereof to eliminate fixed shifts in position of said film with respect to a center position.

7. A film scanning system including in combination, film driving means for providing continuous movement of a motion picture film, means providing a beam which impinges the film, means for scanning the beam across the continuously moving film, said driving means including motor means and flywheel means for reducing rapid variations in film movement, and means responsive to the beam impinging the film including feedback circuit means providing a signal representing the instantaneous position of the film said feedback means applying said signal to said film driving means and to said scanning means for automatically controlling the operation of said beam on said film driving means and the scanning of said beam.

8. A film projector system including in combination, film driving means for providing continuous movement of a motion picture film, means for directing a spot of light on the film to be modulated thereby, scanning means for deflecting the spot of light across the moving film, said driving means including motor means and flywheel means for reducing rapid variations in film movement, and means responsive to the light impinging the film including feedback circuit means providing a signal representing the instantaneous position of the film for automatically adjusting the operation of said motor means and said scanning means to compensate for slow variations in film movement.

9. A film scanning system including in combination, film driving means for providing continuous movement of a motion picture film, means for scanning the continuously moving film in a jump-scan movement which scans each frame of one set of alternate picture frames three times and each frame of the other set of alternate picture frames two times, said driving means including means for reducing rapid variations in film movement, and feedback circuit means controlled by the position of the film for altering the operation of said scanning means, said feedback circuit means including means adjusting the scanning movement to correct for slow variations in film movement and means adjusing the jump-scan movement to compensate for film shrinkage.

10. A system for scanning motion picture film having picture frames thereon and a strip having openings therein placed in fixed positions with respect to the frames including in combination, film driving means for providing continuous movement of the film, said driving means including means for reducing rapid variations in film movement, means for directing a spot of light on the film to be modulated thereby, scanning means for providing movement of said spot of light across the film, means for directing a portion of the light on the strip part of the film, means positioned behind the strip part having a low light reflection index, means responsive to the light reflected from the strip for providing a signal indicating the presence of an opening in the strip, and means controlled by said signal for altering the movement of said scanning means to correct for slow variations in the movement of the film.

11. A system for scanning motion picture film having picture frames thereon and a strip having openings therein placed in fixed positions with respect to the frames, said system including in combination, film driving means for providing continuous movement of the film, means for directing a spot of light on the film to be modulated thereby, scanning means for providing movement of said spot of light across the film, means for directing a portion of the light on the strip part of the film, means positioned behind the strip part having a low light reflection index, means responsive to the light reflected from the strip for providing a signal indicating the presence of an opening in the strip, and means controlled by said signal for altering the movement of said scanning means to correct for variations in the movement of the film.

12. A film scanning system including in combination, film driving means for providing continuous movement of a motion picture film, said driving means including means for reducing rapid variations in film movement, means for directing a spot of light on the moving film to be modulated thereby, means for deflecting said spot of light across the film including means for providing jump-scan vertical movement of said light spot so that individual picture frames on the film are scanned a plurality of times at different points in the motion of the film, and means responsive to the position of said light spot on the film for adjusting the vertical scanning movement to correct for slow variations in the movement of said film so that the succeeding scans of the film frames are held in registry.

13. A film scanning system including in combination, film driving means for providing continuous movement of a motion picture film, said driving means including means for reducing rapid variations in film movement, means for directing a spot of light on the moving film to be modulated thereby, means for deflecting said spot of light across the film including means for providing jump-scan vertical movement of said light spot so that individual picture frames on the film are scanned a plurality of times at different points in the motion of the film, means responsive to the instantaneous position of the film for adjusting the vertical scanning movement to correct for slow variations in the movement of the film, and means responsive to the film movement for adjusting the amplitude of the jump-scan to compensate for shrinkage of the film so that the succeeding scans of the film frames are held in registry.

14. A system for scanning motion picture film having picture frames thereon and indications on the film placed in fixed positions with respect to each frame, said system including in combination, film driving means for providing continuous movement of the film, said driving means including means for reducing rapid variations in film movement, means for directing a spot of light on the film to be modulated thereby, scanning means for providing movement of said spot of light across the film including means for providing vertical movement of said light spot having first, second and third portions, said first portion including means providing a sawtooth fluctuating field for relatively slow scanning in one direction and relatively fast scanning in the opposite direction, said second portion including means providing fixed fields having different values for succeeding scanning operations to provide repeated scanning of individual picture frames at different positions thereof, means for directing light on the indications on the film, and means responsive to the light on the indications for providing a signal indicating the instantaneous position of the film, said third portion including means controlled by said signal for providing a stabilizing field for altering the scanning movement to compensate for slow variations in the movement of the film, and said second portion including means controlled by said signal for controlling the values of said fixed fields provided thereby to compensate for film shrinkage.

15. A system for scanning motion picture film having picture frames thereon and indications on the film placed in fixed positions with respect to each frame, said system including in combination, film driving means for providing continuous movement of the film, said driving means including means for reducing rapid variations in film movement, means for directing a spot of light on the film to be modulated thereby, scanning means for providing movement of said spot of light across the film including means for providing vertical movement of said light spot having first and second portions, said first portion including means providing a sawtooth fluctuating field for relatively slow scanning in one direction and relatively fast scanning in the opposite direction, said second portion including means providing fixed fields having different values for succeeding scanning operations to provide repeated scanning of individual picture frames on the film, means for directing light on the indications on the film, and means responsive to the light on the indications for providing a signal indicating the instantaneous position of the film, said second portion including means controlled by said signal for controlling the values of said fixed fields provided thereby to compensate for film shrinkage.

16. A system for scanning motion picture film having picture frames thereon and indications on the film placed in fixed positions with respect to each frame, said system including in combination, film driving means for providing continuous movement of the film, said driving means including means for reducing rapid variations in film movement, means for directing a spot of light on the film to be modulated thereby, scanning means for providing movement of said spot of light across the film including means for providing vertical movement of said light spot having first, second and third portions, said first portion including means providing a sawtooth fluctuating field for relatively slow scanning in one direction and relatively fast scanning in the opposite direction, said second portion including means providing fixed fields having different values for succeding scanning operations to provide repeated scanning of individual picture frames on the film, means for directing light on the indications on the film, and means responsive to the light on the indications for providing a signal indicating the instantaneous position of the film, means controlled by said signal for providing a position error voltage and a stride error voltage, said film driving means including means controlled by said position error voltage for adjusting the phase thereof to compensate for fixed shifts in the position of the film, said third portion including means controlled by said position error voltage for providing a stabilizing field for altering the scanning movement to compensate for slow variations in the movement of the film, and said second portion including means controlled by said stride error voltage for controlling the values of said fixed fields provided thereby to compensate for film shrinkage.

17. A system for scanning motion picture film to provide fields for television transmission, with the film having picture frames thereon and indications on the film placed in fixed positions with respect to each frame, said system including in combination, film driving means for providing continuous movement of the film, said driving means including means for reducing rapid variations in film movement, means for directing a spot of light on the film to be modulated thereby, scanning means for providing movement of said spot of light across the film including, means for providing field scanning pulses for controlling the movement of said spot and means controlled by said field scanning pulses for providing vertical movement of said light spot having first, second and third portions, said first portion including means synchronized by said field scanning pulses providing a sawtooth fluctuating field for relatively slow vertical scanning in one direction and relatively fast retrace in the opposite direction, said second portion including means synchronized by said field scanning pulses providing fixed fields having different values for succeeding vertical scanning operations to provide repeated scanning of individual picture frames on the film, means for directing light on the indications on the film, means responsive to the light reflected by the indications for providing a signal indicating the instantaneous position of the frames of the film, and means for comparing said signal and said field scanning pulses to provide a position error voltage and a stride error voltage, said film driving means including means controlled by said position error voltage for adjusting the phase thereof to compensate for fixed shifts in the position of the film, said third portion including means controlled by said position error voltage for providing a stabilizing field for altering the scanning movement to compensate for slow variations in the movement of the film, and said second portion including means controlled by said stride error voltage for controlling the values of said fixed fields provided thereby to compensate for film shrinkage.

18. A system for scanning motion picture film to provide fields for television transmission, with the film having picture frames thereon and indications on the film placed in fixed positions with respect to each frame, said system including in combination, film driving means for providing continuous movement of the film, said driving means including means for reducing rapid variations in film movement, means for directing a spot light on the film to be modulated thereby, scanning means for providing movement of said spot of light across the film including, means for providing field scanning pulses for controlling the movement of said spot and means controlled by said field scanning pulses for providing vertical movement of said light spot having first and second portions, said first portion including means synchronized by said field scanning pulses providing a sawtooth fluctuating field for relatively slow vertical scanning in one direction and relatively fast retrace in the opposite direction, said second portion including means synchronized by said field scanning pulses providing fixed fields having different values for succeeding vertical scanning operations to provide repeated scanning of individual picture frames on the film, means for directing light on the indications on the film, means responsive to the light reflected by the indications to provide a signal including pulses indicating the instantaneous position of the frames of the film, and means for comparing said signal and said field scanning pulses for providing a stride error voltage which varies plus and minus with variation in repetition rate of the pulses of said signal and the repetition rate of said field scanning pulses, said second portion including means controlled by said stride error voltage for controlling the values of said fixed fields provided thereby to compensate for film shrinkage.

19. A system for scanning motion picture film to provide fields for television transmission, with the film having picture frames thereon and indications on the film placed in fixed positions with respect to each frame, said system including in combination, film driving means for providing continuous movement of the film, said driving means including means for reducing rapid variations in film movement, means for directing a spot light on the film to be modulated thereby, scanning means for providing movement of said spot of light across the film including, means for providing field scanning pulses for controlling the movement of said spot, and means controlled by said field scanning pulses for providing vertical movement of said light spot having first and second portions, said first portion including means synchronized with said field scanning pulses providing sawtooth fluctuating fields and fixed fields having different values for succeeding scanning operations to provide repeated vertical scanning of individual picture frames on the film, said second portion including means correcting for slow variations in the movement of the film, means for directing light on the indications on the film, and means responsive to the light reflected by the indications for providing a signal including pulses indicating the instantaneous position of the frames of the film and means for comparing said signal and said field scanning pulses to provide a position error voltage varying with the position of said pulses of said signal and the corresponding field scanning pulses, said film driving means including means controlled by said position error voltage for adjusting the phase thereof to compensate for fixed shifts in the position of the film, and said second portion including means controlled by said position error voltage for providing a stabilizing field for altering the scanning movement to compensate for slow variations in the movement of the film.

20. A system for scanning a subject wherein a reference is provided in fixed position with respect to the subject, such system including in combination, means providing a beam means deflecting said beam, in a regular scanning movement to cover an area including the subject and the reference, feedback means responsive to the instantaneous position of said beam with respect to the reference, said feedback means providing a signal varying in accordance with the position of the area scanned by said beam with respect to the reference, and means for applying said signal to said deflecting means for altering the regular scanning movement thereof to hold the area scanned in a predetermined position with respect to the reference.

References Cited in the file of this patent

UNITED STATES PATENTS

| | | |
|---|---|---|
| 2,024,609 | Smythe | Dec. 17, 1935 |
| 2,523,156 | Somers | Sept. 19, 1950 |
| 2,525,891 | Garman et al. | Oct. 17, 1950 |
| 2,590,281 | Sziklai et al. | Mar. 25, 1952 |
| 2,601,790 | Magnusson | July 1, 1952 |
| 2,666,356 | Graham et al. | Jan. 19, 1954 |
| 2,786,888 | Hadfield | Mar. 26, 1957 |
| 2,818,466 | Larson | Dec. 31, 1957 |

FOREIGN PATENTS

| | | |
|---|---|---|
| 690,482 | Great Britain | Apr. 22, 1953 |